(12) United States Patent
Yamamura

(10) Patent No.: US 7,734,834 B2
(45) Date of Patent: Jun. 8, 2010

(54) MULTI-FUNCTION PERIPHERAL AND INFORMATION ACQUISITION SYSTEM INCLUDING A PLURALITY OF THE MULTI-FUNCTION PERIPHERALS

(75) Inventor: Miho Yamamura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 259 days.

(21) Appl. No.: 11/804,296

(22) Filed: May 17, 2007

(65) Prior Publication Data

US 2007/0273896 A1 Nov. 29, 2007

(30) Foreign Application Priority Data

May 26, 2006 (JP) .............................. 2006-146216

(51) Int. Cl.
*G06F 3/00* (2006.01)
*G06F 13/00* (2006.01)

(52) U.S. Cl. .................................. 710/5; 710/8; 710/15

(58) Field of Classification Search ........................ None
See application file for complete search history.

(56) References Cited

U.S. PATENT DOCUMENTS

2003/0142348 A1* 7/2003 Hiramatsu et al. ......... 358/1.15

2003/0233441 A1* 12/2003 Nishiyama et al. .......... 709/223

FOREIGN PATENT DOCUMENTS

| JP | 05-308450 | 11/1993 |
|----|-----------|---------|
| JP | 2003-280830 | 10/2003 |

* cited by examiner

*Primary Examiner*—Tariq Hafiz
*Assistant Examiner*—Scott Sun
(74) *Attorney, Agent, or Firm*—David G. Conlin; Steven M. Jensen; Edwards Angel Palmer & Dodge LLP

(57) ABSTRACT

An acquisition condition of information can automatically be determined based on data processed by a multi-function peripheral to acquire information from other multi-function peripherals in accordance with the condition while maintaining security. When an MFP performs a printing process or an image reading process by scanner in a system connecting a plurality of MFPs, a certain predetermined word and the number of usage times thereof, etc., are extracted from the data and written and retained into log information. The MFP determines whether associated data are acquired from other MFPs for each word extracted based on the log information. If a certain MFP acquires data processed by other MFPs, the log information retained by other MFPs is checked in accordance with an acquisition condition retained by each MFP, and data corresponding to the log information conforming to the acquisition condition are acquired from other MFPs and stored in the own machine.

20 Claims, 21 Drawing Sheets

FIG. 5A

| BUSINESS TERM LIST |
| --- |
| SALES |
| SALES DEPARTMENT |
| . . . |
| DOMESTIC |
| FOREIGN |
| COPY MACHINE |
| MULTI-FUNCTION PERIPHERAL |
| . . . |

FIG. 5B

| TECHNICAL TERM LIST |
| --- |
| DRIVER |
| OSA |
| . . . |
| Sharpdesk |
| PAU |
| SOAP |
| Java |
| . . . |

FIG. 6

| DATA NAME (ID NAME) | DATA CREATION DATE | WORD LIST AFTER ANALYZING MORPHEMES | WORD EXISTING IN TECHNICAL/BUSINESS TERM LIST AND NUMBER OF USAGE TIMES | PRESENCE OF SEAL IMPRESSION IN MANAGER FIELD | PRESENCE OF CONFIDENTIAL INFORMATION |
|---|---|---|---|---|---|
| DOMESTIC SALES IN DECEMBER | DEC. 27, 2005 | SALES 3, MULTI-FUNCTION PERIPHERAL 1, DO 20, DECEMBER 1 | SALES 3, MULTI-FUNCTION PERIPHERAL 1 ... | NO | NO |
| FOREIGN SALES IN NOVEMBER | NOV. 28, 2005 | SALES 2, MULTI-FUNCTION PERIPHERAL 2, DONE 15, NOVEMBER 1 | SALES 2, MULTI-FUNCTION PERIPHERAL 2 ... | NO | NO |
| 3541256.pdf | JAN. 6, 2006 | OVERTIME 1, DEC. 1ST 1 ... | OVERTIME 1 | NO | NO |
| ATTENDANCE MANAGEMENT TABLE OF FIRST HALF OF 2005 | OCT. 20, 2005 | OVERTIME 1, PAID HOLIDAY 1, HALF HOLIDAY 1, APRIL 1, MAY 1 | OVERTIME 1, PAID HOLIDAY 1, HALF HOLIDAY 1 ... | NO | YES |
| DOMESTIC SALES IN DECEMBER | DEC. 28, 2005 | SALES 3, MULTI-FUNCTION PERIPHERAL 1, DO 20, DECEMBER 1 | SALES 3, MULTI-FUNCTION PERIPHERAL 2 ... | NO | NO |
| 3543826.pdf | JAN. 10, 2006 | OVERTIME 1, DEC. 1ST 1 | OVERTIME 1 | YES | NO |
| ... | | | | ... | ... |

FIG. 7

DO YOU SET PERIOD FOR DETERMINING DATA ACQUISITION CONDITION?
IF YOU SET PERIOD, PLEASE SPECIFY LENGTH.

PERIOD SETTING: YES   NO
SET PERIOD: EVERY DAYS OR MONTHS

DATA ACQUISITION CONDITION WILL BE DETERMINED.
DETERMINE ACQUISITION METHOD.

WORD USAGE FREQUENCY
NUMBER OF USING JOBS

HOW MANY TIMES WORD MUST BE USED TO START DATA ACQUISITION?

WORD USAGE FREQUENCY    TIMES

HOW MANY JOBS MUST USE WORD TO START DATA ACQUISITION?
PLEASE SET THE VALUE.

NUMBER OF JOBS    PIECES

| EXTRACTED WORD | NUMBER OF USAGE TIMES | NUMBER OF USING JOBS | DATA ACQUISITION |
|---|---|---|---|
| SALES | 10 | 3 | DECIDED |
| SALES DEPARTMENT | 8 | 5 | DECIDED |
| ... | ... | ... | ... |
| DOMESTIC | 20 | 20 | DECIDED |
| FOREIGN | 6 | 4 | UNDECIDED |
| COPY MACHINE | 1 | 1 | UNDECIDED |
| ... | ... | ... | ... |

FIG. 12

| MULTI-FUNCTION PERIPHERAL NAME | SETUP LOCATION | GROUP NAME |
|---|---|---|
| AR-C170FP (OWN MACHINE) | FIRST BUSINESS SECTION | 1 |
| AR-C260F | FIRST BUSINESS SECTION | 1 |
| IRC3160N | SECOND BUSINESS SECTION | 1 |
| AR-170FP | SECOND BUSINESS SECTION | 1 |
| Imagio NEO C385 | FIRST TECHNICAL DEPARTMENT | 2 |
| AR-S507 | SECOND TECHNICAL DEPARTMENT | 2 |
| ... | ... | ... |

FIG. 13

MULTI-FUNCTION PERIPHERALS IN BUSINESS DEPARTMENTS ON NETWORK ARE AS FOLLOWS. ARE THESE MULTI-FUNCTION PERIPHERALS GROUPED AS GROUP 1? IF YOU WANT TO ADD, CHANGE, OR DELETE MACHINE, PLEASE SELECT AND MANIPULATE.

| MACHINE NAME | SETUP DEPARTMENT |
|---|---|
| AR-C170FP | FIRST BUSINESS SECTION |
| AR-C260F | FIRST BUSINESS SECTION |
| IRC3160N | SECOND BUSINESS SECTION |
| AR-170FP | SECOND BUSINESS SECTION |

| EDIT | ADD | DELETE | OK |

FIG. 14

WHAT IS USED AS BASIS OF CONTINUING ACQUISITION OF DATA OF LISTED WORDS? PLEASE SELECT FROM FOLLOWING ITEMS.

NUMBER OF UTILIZATION TIMES

IMPORTANCE

| OK |

FIG. 15

HOW MANY TIMES AND IN WHAT PERIOD WORD MUST BE USED TO CONTINUE ACQUISITION OF DATA INCLUDING THE WORD ? PLEASE SET.

NUMBER OF UTILIZATION TIMES    TIMES

IMPORTANCE    DAYS

PLEASE SET IMPORTANCE OF LISTED WORDS

| WORD | IMPORTANCE | | |
|---|---|---|---|
| SALES | ☐HIGH | ☐INTERMEDIATE | ☐LOW |
| DOMESTIC | ☐HIGH | ☐INTERMEDIATE | ☐LOW |
| FOREIGN | ☐HIGH | ☐INTERMEDIATE | ☐LOW |
| SALES DEPARTMENT | ☐HIGH | ☐INTERMEDIATE | ☐LOW |

CANCEL    OK

FIG. 17

PLEASE SET NUMBER OF DAYS AFTER LAST USAGE DATE FOR TERMINATING DATA ACQUISITION.

IMPORTANCE
HIGH:        — DAYS
INTERMEDIATE:  DAYS
LOW:         DAYS

CANCEL    OK

FIG. 18

| WORD | NUMBER OF UTILIZATION TIMES | IMPORTANCE | LAST USAGE DATE | ACQUISITION CONTINUED? |
|---|---|---|---|---|
| SALES | 8 | HIGH | JAN. 15, 2006 | YES |
| DOMESTIC | 5 | INTERMEDIATE | JAN. 26, 2006 | YES |
| FOREIGN | 2 | INTERMEDIATE | JAN. 10, 2006 | NO |
| SALES DEPARTMENT | 0 | LOW | DEC. 25, 2005 | NO |
| ... | ... | ... | ... | ... |

FIG. 19

PLEASE SET NUMBER OF DAYS AFTER LAST USAGE DATE FOR DELETING DATA.

INTERVAL          DAYS

CANCEL   OK

FIG. 20

| DATA NAME (ID NAME) | DATA CREATION DATE | LAST USAGE DATE | SCHEDULED DELETE DATE | WORD AFTER ANALYZING MORPHEMES | WORD EXISTING IN TECHNICAL/BUSINESS TERM LIST |
|---|---|---|---|---|---|
| DOMESTIC SALES IN DECEMBER | DEC. 28, 2005 | JAN. 10, 2006 | JAN. 10, 2007 | SALES, MULTI-FUNCTION PERIPHERAL, DO, DECEMBER ... | SALES, MULTI-FUNCTION PERIPHERAL ... |
| FOREIGN SALES IN NOVEMBER | NOV. 28, 2005 | DEC. 28, 2005 | DEC. 28, 2006 | SALES, MULTI-FUNCTION PERIPHERAL, DONE, NOVEMBER ... | SALES, MULTI-FUNCTION PERIPHERAL ... |
| 3541256.pdf | JAN. 6, 2006 | — | JAN. 6, 2007 | OVERTIME, DECEMBER, 1ST ... | OVERTIME |
| ATTENDANCE MANAGEMENT TABLE OF FIRST HALF OF 2005 | OCT. 20, 2005 | — | OCT. 20, 2006 | OVERTIME, PAID HOLIDAY, HALF HOLIDAY, APRIL, MAY ... | OVERTIME, PAID HOLIDAY, HALF HOLIDAY ... |
| ... | ... | ... | ... | | | ns
MULTI-FUNCTION PERIPHERAL AND INFORMATION ACQUISITION SYSTEM INCLUDING A PLURALITY OF THE MULTI-FUNCTION PERIPHERALS

CROSS-NOTING PARAGRAPH

This Non-provisional application claims priority under 35 U.S.C. §119 (a) on Patent Application No. 2006-146216 filed in JAPAN on May 26, 2006, the entire contents of which are hereby incorporated herein by reference.

FIELD OF THE INVENTION

The present invention relates generally to a multi-function peripheral and an information acquisition system including a plurality of the multi-function peripherals, and, more particularly, to a multi-function peripheral including a scanner function and a print function and capable of automatically acquiring data retained by other network-connected multi-function peripherals, and an information acquisition system including a plurality of the network-connected multi-function peripherals.

BACKGROUND OF THE INVENTION

Recently, in an office, an MFP (multi-function peripheral) which includes a plurality of functions such as a print function, facsimile function and a scanner function, and which stores data utilizing these functions is used. The data can be shared among a plurality of MFPs and PC servers connected through a network.

If a user wants some information, the user generally uses, for example, a personal computer on the network and manually searches a server, etc., to display retrieved information. If the retrieved information must be printed, the user instructs the MFP to print the retrieved information.

Japanese Laid-Open Patent Publication No. 2003-280830 discloses an information acquisition system that acquires information existing on a network from a multi-function peripheral without using a personal computer, etc. This information acquisition system connects a multi-function peripheral utilizing the information through a network to a server operated by a provider of an information providing service. The multi-function peripheral transmits a condition of information provided from the information providing service, a user requesting the information, and the unique information of the multi-function peripheral through the network to the server. The server receives the data transmitted from the multi-function peripheral, refers to a customer information database to retrieve information conforming to the condition requested by the user, and sends back the retrieved result to the requesting multi-function peripheral.

However, in the information acquisition system described in Japanese Laid-Open Patent Publication No. 2003-280830, a user must input desired information to the multi-function peripheral and it is problematic that this operation takes time and effort. Since the multi-function peripheral only acquires information specified by the user from the server in this case, it is difficult to acquire a wide range of information such as information related to the desired information.

SUMMARY OF THE INVENTION

An object of the present invention is to provide a multi-function peripheral that can automatically determine an acquisition condition of information based on data processed by the multi-function peripheral to acquire information from other multi-function peripherals in accordance with the condition while maintaining security in a system that enables sharing of information by connecting a plurality of multi-function peripherals with the information thereof through a network, and to provide an information acquisition system including a plurality of the network-connected multi-function peripherals.

Another object of the present invention is to provide a multi-function peripheral with a plurality of functions including a print function, a facsimile function, and a scanner function, comprising a storage portion that stores log information of a job performing a data process and data corresponding to the log information when data are processed with any one of the plurality of functions, a retaining portion that creates and retains an acquisition information list defining a condition of acquiring information from other multi-function peripherals based on the data processed with any one of the plurality of functions, and an acquiring portion that checks log information stored in other multi-function peripherals connected to the multi-function peripherals based on the acquisition information list to acquire data corresponding to the log information conforming to the condition defined in the acquisition information list from the other multi-function peripherals.

Another object of the present invention is to provide the multi-function peripheral, wherein every time data are processed with any one of the plurality of functions, at a predetermined timing set in advance, or in accordance with a log information reference request input from other multi-function peripherals, the multi-function peripheral transmits the log information to other multi-function peripherals allowed to acquire data.

Another object of the present invention is to provide a multi-function peripheral, wherein the multi-function peripheral receives the acquisition information list from other multi-function peripherals to transmit data conforming to the condition defined in the acquisition information list to the other multi-function peripherals.

Another object of the present invention is to provide the multi-function peripheral, wherein the multi-function peripheral preliminarily retains a word list that lists up words acting as keys for data acquisition from other multi-function peripherals, refers to the word list when data are processed with any one of the plurality of functions, extracts a word matched with the word list from the processed data, and writes the extracted word and the number of usage times of the extracted word in each job into the log information of the job corresponding to the data process.

Another object of the present invention is to provide the multi-function peripheral, wherein when data are processed with any one of the plurality of functions, the multi-function peripheral performs a morphological analysis to classify the processed data into words and checks the classified word against the word list to extract a word matched with the word list.

Another object of the present invention is to provide the multi-function peripheral, wherein in the acquisition condition of the acquisition information list, if the number of usage times of the word extracted from the data is a predetermined number of times or more or if the number of jobs using the extracted word is a predetermined number of times or more, the data including the extracted word are acquired from the other multi-function peripherals.

Another object of the present invention is to provide the multi-function peripheral, wherein setting can selectively be performed for whether the information is acquired based on the number of usage times of the extracted word or acquired based on the number of jobs using the extracted word.

Another object of the present invention is to provide the multi-function peripheral, wherein the multi-function peripheral can set a period of counting the number of usage times of the extracted word or the number of jobs using the extracted word and wherein every time the set period elapses, the multi-function peripheral counts the number of usage times of the extracted word or the number of jobs using the extracted word in the elapsed period to determine whether the data including the extracted word are acquired from the other multi-function peripherals.

Another object of the present invention is to provide the multi-function peripheral, wherein the multi-function peripheral groups other multi-function peripherals and the own machine based on unique identification information registered in each of other connected multi-function peripherals to acquire the data only from the grouped multi-function peripherals.

Another object of the present invention is to provide the multi-function peripheral, wherein the multi-function peripheral acquires only the data that cannot be edited, including scan data and copy data, from the other multi-function peripherals.

Another object of the present invention is to provide the multi-function peripheral, wherein if data corresponding to the log information retained by the other multi-function peripherals include information related to confidential items, the data are not acquired from other multi-function peripherals.

Another object of the present invention is to provide the multi-function peripheral, wherein if a plurality of data with the same file name exists in the log information retained by the other multi-function peripherals, only the latest data are acquired from the other multi-function peripherals based on the creation date of the data with the same file name.

Another object of the present invention is to provide the multi-function peripheral, wherein if a plurality of data with the same file name exists in the log information retained by the other multi-function peripherals, it is determined in accordance with a predetermined image analyzing process result whether the data include a seal impression in a seal impression field of a final approver and wherein only the data including a seal impression in the seal impression field of the final approver are acquired from the other multi-function peripherals.

Another object of the present invention is to provide the multi-function peripheral, wherein after the data including the word written into the log information are acquired from the other multi-function peripherals, the multi-function peripheral determines whether the data acquisition from the other multi-function peripherals is continued for the word included in the data, based on the number of reuse times of the data in a predetermined period.

Another object of the present invention is to provide the multi-function peripheral, wherein the multi-function peripheral can set importance of the word written into the log information and wherein after the data are acquired from the other multi-function peripherals, the multi-function peripheral determines whether the data acquisition from the other multi-function peripherals is continued for the word, based on the importance of the word included in the acquired data.

Another object of the present invention is to provide the multi-function peripheral, wherein setting can selectively be performed for whether the data acquisition is continued based on the number of reuse times of the data in the predetermined period or continued based on the importance of the word.

Another object of the present invention is to provide the multi-function peripheral, wherein the multi-function peripheral includes a table of the data acquired from the other multi-function peripherals and wherein double acquisition of the same data from the other multi-function peripherals is prevented by comparing the log information stored in the other multi-function peripherals with the table of the data acquired from the other multi-function peripherals.

Another object of the present invention is to provide the multi-function peripheral, wherein after acquiring the data from the other multi-function peripherals, the multi-function peripheral sets a scheduled deletion date based on the last usage date of reuse of the acquired data to display an alert indicating that the corresponding data are deleted when the scheduled deletion date is passed.

Another object of the present invention is to provide an information acquisition system including a plurality of the multi-function peripherals through a network, the information acquisition system enabling a data acquisition process among the multi-function peripherals.

BRIEF DESCRIPTION OF THE DRAWINGS

FIGS. 5A and 5B depict an example of technical/business term list retained by each MFP;

FIG. 6 depicts an example of a table (referred to as a log information table) showing a result of classification by jobs and analysis of log information of data processed by the own machine;

FIG. 7 depicts an example of a setting screen for setting a period of the data acquisition condition;

FIG. 8 depicts an example of a setting screen of a condition for determining the necessity of the data acquisition;

FIG. 9 depicts an example of a setting screen for a word usage frequency;

FIG. 10 depicts an example of a setting screen for the number of jobs;

FIG. 11 depicts an example of a list (an acquisition information list) determining whether data are acquired from other MFPs for each word in accordance with the condition determined on the screens such as FIGS. 7 to 10;

FIG. 12 depicts an example of a list when the MFPs on the network are grouped depending on setup locations;

FIG. 13 depicts an example of a screen for checking and setting the grouping of the MFPs;

FIG. 14 depicts an example of a setting screen for setting a continuation condition of the data acquisition;

FIG. 15 depicts an example of a number of utilization times setting screen;

FIG. 16 depicts an example of an importance setting screen;

FIG. 17 depicts an example of a screen that sets a condition of terminating the data acquisition;

FIG. 18 depicts an example of a table (a continuation determination table) determining whether the data acquisition from other MFPs is continued for each word in accordance with the condition determined on the screens such as FIGS. 14 to 17;

FIG. 19 depicts an example of a screen that sets a condition of deleting data acquired from other MFPs;

FIG. 20 depicts an example of creating a table of data acquired by the MFP from other MFPs;

PREFERRED EMBODIMENTS OF THE INVENTION

Figure 1:
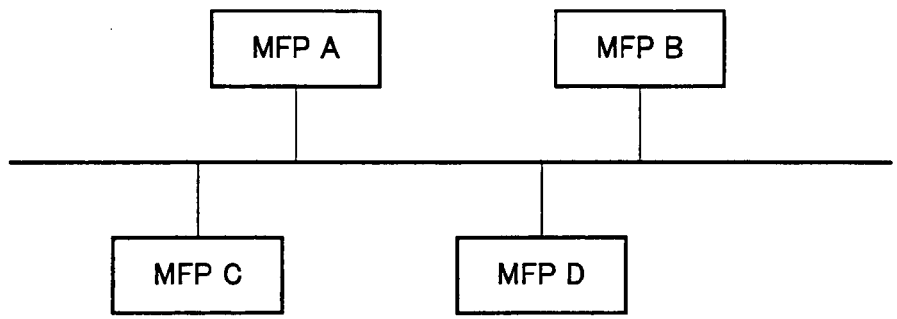
FIG. 1 is an explanatory view of a structural example of an information acquisition system that uses multi-function peripherals of the present invention.

FIG. 1 is an explanatory view of a structural example of an information acquisition system that uses multi-function peripherals of the present invention. In the information acquisition system, a plurality of multi-function peripherals (MPF (A) to (D)) is connected through a communication network. The applicable communication network can be an area network such as LAN and WAN, the internet using a public line network, or a combination thereof.

The MFP includes combined functions such as a printer function, a facsimile function, and a scanner function, also includes a communication function, and is connected to the network. The MFP can transmit and receive through the communication network the print data using the printer function, the facsimile data using the facsimile function, and the scanner data and copy data read with the scanner function.

In this embodiment, each MFP can automatically determine a data acquisition condition for acquiring data from other MFPs in a system connected with a plurality of MFPs shown in FIG. 1. In this case, when the MFP performs a printing process or an image reading process with the scanner, the MFP extracts from the processed data a predetermined certain word and the number of usage times thereof, presence of a seal impression of a manager, presence of confidential information such as a secret mark, etc., which are additionally written into the log information of the job and retained as a log information table.

The MFP also extracts words acting as keywords for acquiring data from other multi-function peripherals based on the log information table to set and retain a list (an acquisition information list) determining whether associated data are acquired from other MFPs for each word.

If a certain MFP acquires data processed by other MFPs, the log information tables retained by other MFPs are checked in accordance with the acquisition information list retained by each MFP, and the data corresponding to the log information conforming to the acquisition information list are acquired from other MFPs and stored in the own machine. Such a data acquisition process will hereinafter be described in detail.

Figure 2:
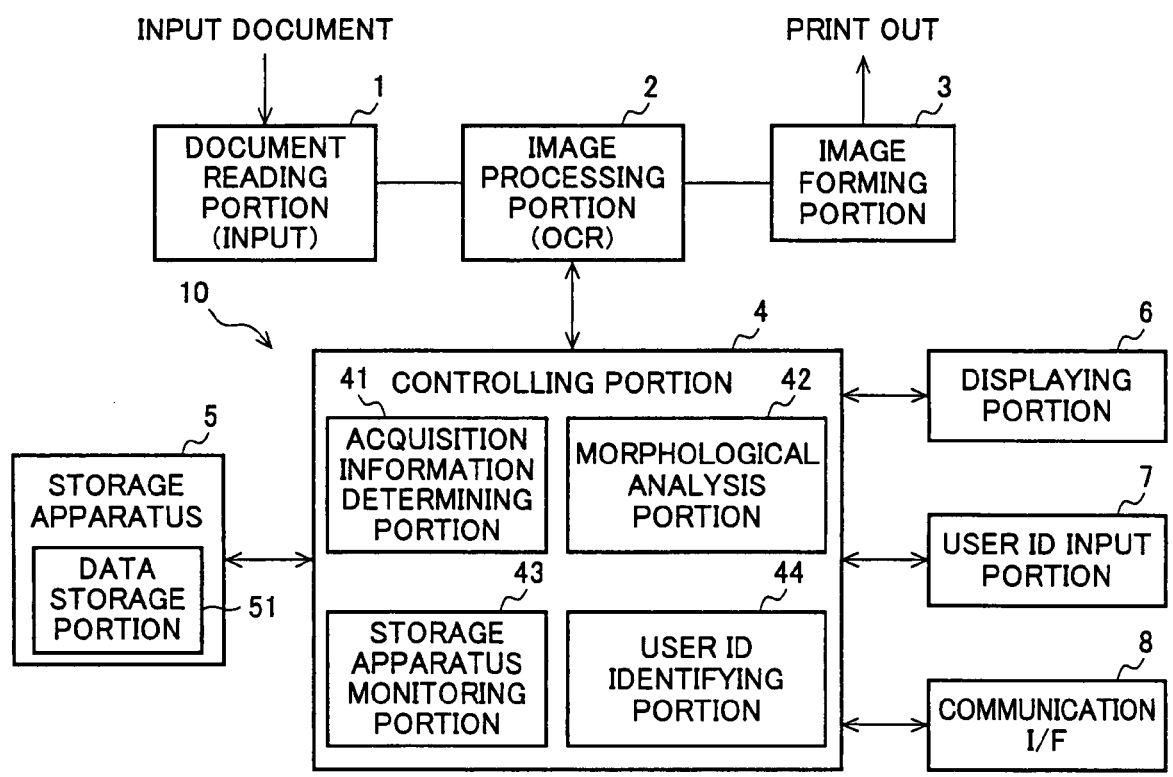
FIG. 2 is an explanatory block diagram of a structural example of a multi-function peripheral (MFP) according to the present invention.

FIG. 2 is an explanatory block diagram of a structural example of the multi-function peripheral (MFP) according to the present invention.

An MFP 10 includes a communication I/F 8 and is connected to the communication network through the communication I/F 8 to enable data transmission/reception.

A document reading portion 1 inputs a document image and includes, for example, a CCD for capturing the document image as image data and a document detecting sensor that detects presence of document.

An image processing portion 2 performs the OCR (Optical Character Reader) process for the image data read by the document reading portion 1 to enable generation of character data. In the OCR, the image read by the document reading portion 1 is checked against patterns stored in advance to identify characters and to generate the digitized character data.

An image forming portion 3 prints and outputs the image data read by the document reading portion 1 or the print data input from the communication I/F 8 onto recording paper, etc.

A storage apparatus 5 includes a data storage portion 51 and can store various data and programs handled in the multi-function peripheral. The storage apparatus 5 can store data particularly related to the present invention, such as the log information of the image data read by the own document reading portion 1 and the log information of the print data input from the communication I/F 8, and can also store data acquired from other multi-function peripherals and data processed in the own machine.

A user ID input portion 7 is configured by a touch panel, keys, etc., that enable the input through the user operation and can input a user ID necessary for authentication when a user uses the MFP 10. A displaying portion 6 is configured by a displaying portion that displays various data and information, such as an LCD.

A controlling portion 4 controls each portion of the MFP 10 and includes an acquisition information determining portion 41, a morphological analysis portion 42, a storage apparatus monitoring portion 43, and a user ID identifying portion 44. These functions are implemented by programs, and the functions of the portions can be implemented in accordance with the programs by reading predetermined programs stored in the storage apparatus 5.

The morphological analysis portion 42 analyzes the character data digitized by the image processing portion 2 to classify the data into words. The acquisition information determining portion 41 determines information acquired from other MFPs based on the words classified by the morphological analysis portion 42.

The user ID identifying portion 44 identifies a user ID input from the user ID input portion 7 and determines whether the user ID is valid.

The storage apparatus monitoring portion 43 monitors the storage apparatuses of other network-connected MFPs and determines whether the storage apparatuses of other MFPs include information to be acquired by the own machine based on the log information of jobs retained in the storage apparatuses. In this case, other MFPs may transmit the log information of the processed jobs to each MFP at the time of data processing or at a predetermined timing, or the data acquiring MFP may refer to the log information retained in other MFPs as needed.

Figure 3:
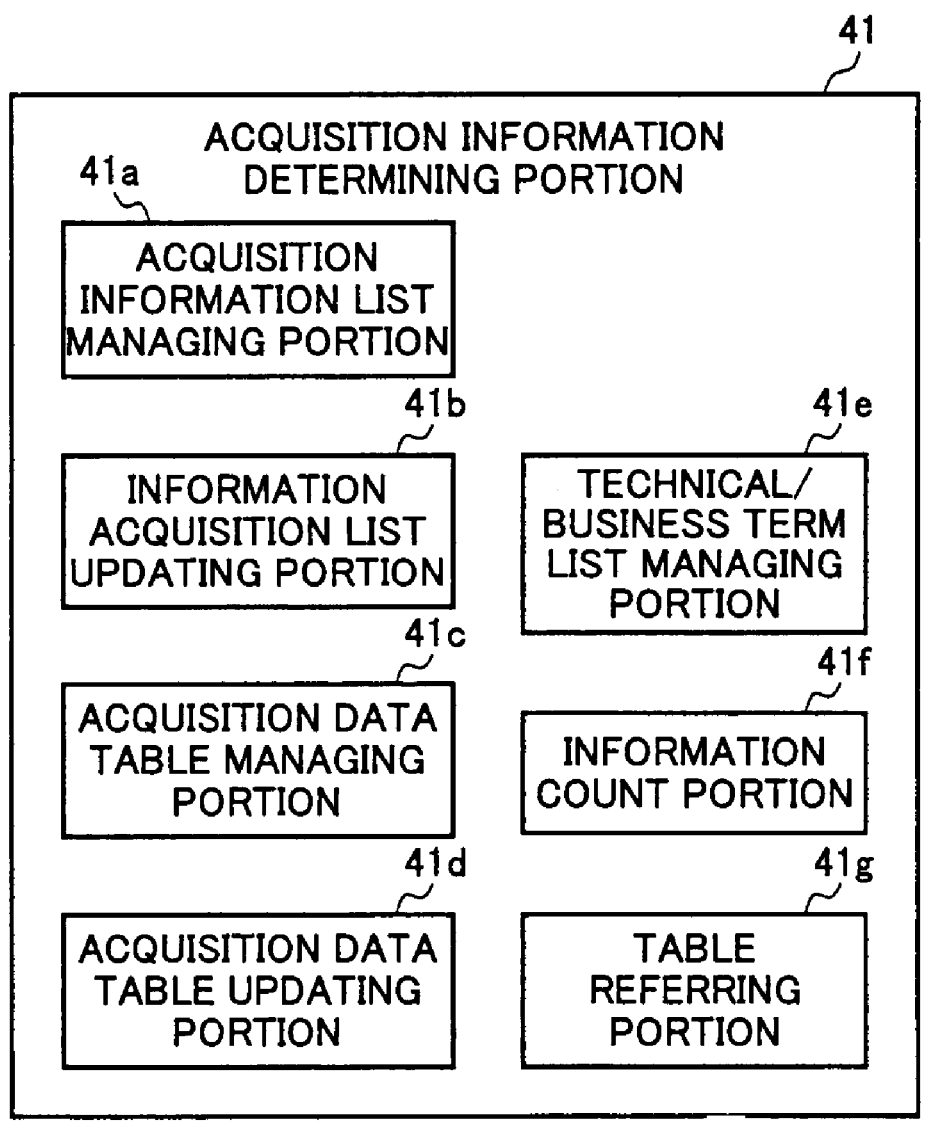
FIG. 3 is an explanatory block diagram of a detailed structural example of an acquisition information determining portion shown in FIG. 2.

FIG. 3 is an explanatory block diagram of a detailed structural example of the acquisition information determining portion shown in FIG. 2. The acquisition information determining portion 41 includes an acquisition information list managing portion 41a, an acquisition information list updating portion 41b, an acquisition data table managing portion 41c, an acquisition data table updating portion 41d, a technical/business term list managing portion 41e, an information count portion 41f, and a table referring portion 41g. These functions are also realized by predetermined programs.

The technical/business term list managing portion 41e manages technical/business terms retained in each MFP. The table referring portion 41g refers to each table owned by the acquisition information determining portion 41. The acquisition information list managing portion 41a manages a list (an acquisition information list) defining a condition of acquiring data from other MFPs.

The information count portion 41f counts the number of usage times of an acquisition candidate word and the number of jobs using the acquisition candidate word in the data processed by MFP. The information count portion 41f also counts the number of times that the data acquired from other MFPs are utilized. The count results are entered in the acquisition information list.

The term "utilization" as used herein indicates that the data acquired and retained in the MFP are reutilized by a user. For example, this "utilization" includes a process of printing the print data acquired from other MFPs or a process of further transmitting the acquired data to another terminal apparatus, etc.

The acquisition information list updating portion 41b updates the number of word usage times and the number of the using jobs in the acquisition information list in accordance with the count of the information count portion 41f.

The acquisition data table managing portion 41c manages data acquired from other MFPs, for example, the MFP (B), the MFP (C) and the MFP (D), in an acquisition data table. The acquisition data table updating portion 41d updates the acquisition data table in accordance with the data acquisition from other MFPs.

Figure 4:
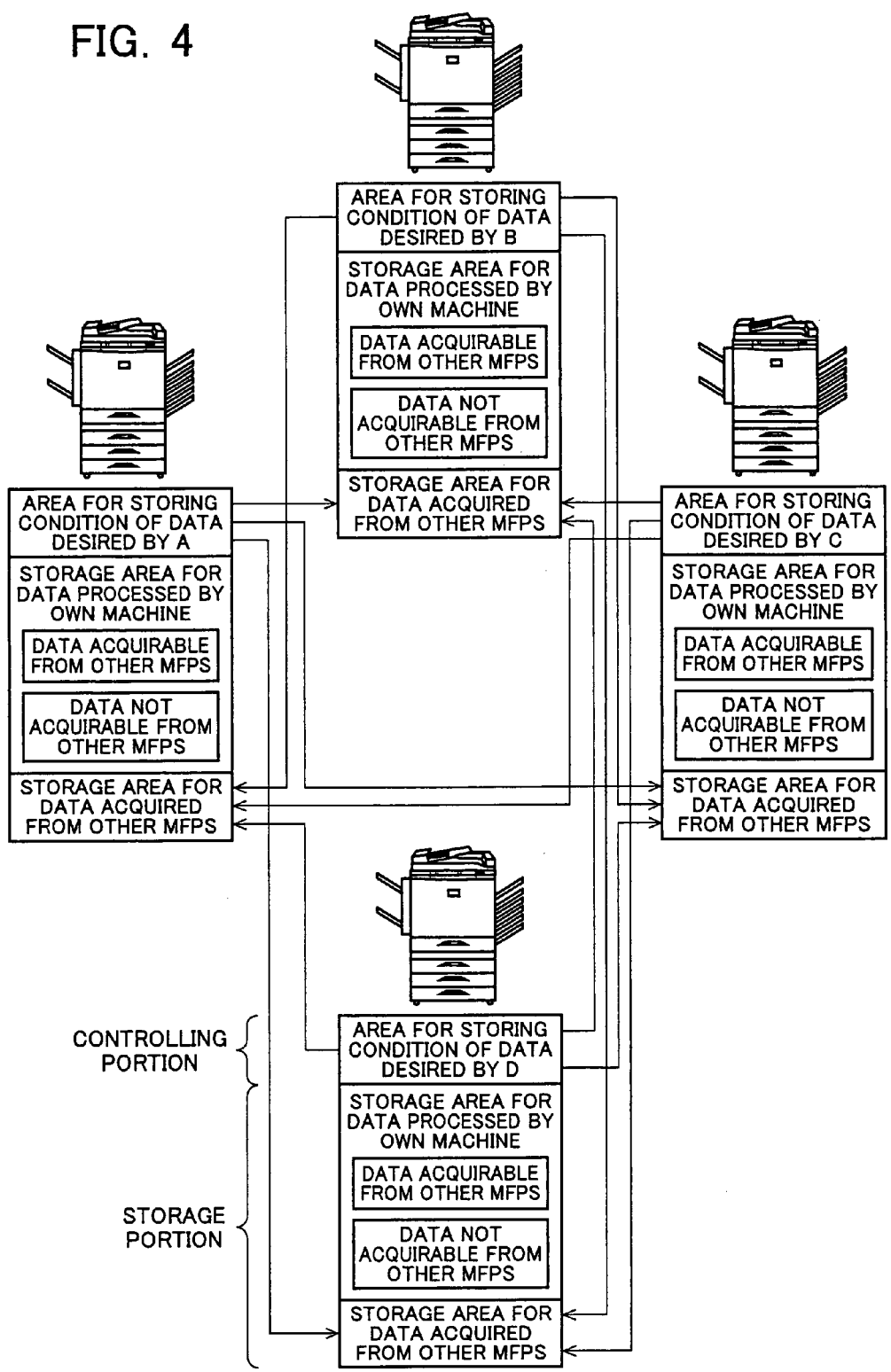
FIG. 4 is a conceptual explanatory view of data storing and acquiring processes in the present invention.

FIG. 4 is a conceptual explanatory view of data storing and acquiring processes in the present invention. It is assumed that the MFPs (A), (B), (C) and (D) are connected through the communication network shown in FIG. 1. Each MFP includes a storage apparatus to set an area storing a condition of data desired by the own machine, a storage area for data processed in the own machine, and a storage area for data acquired from other MFPs.

The data processed in the own machine indicates the data processed when the MFP performs the printing process or the image reading process by itself. For example, the data correspond to the print data when the printing process is performed in the own machine and the image data when the image reading process is performed by the scanner of the own machine. The print data correspond to the print data transmitted from other MFPs, other network terminals, etc. The image data processed in the image reading process correspond to copy data read using a copy function, facsimile data read using a facsimile function, etc.

In the storage area for data processed in the own machine of each MFP, storage areas are set for data acquirable from other MFPs and data not acquirable from other MFPs. When the MFP allows another MFP to acquire the own storage data, each MFP can manage data including confidential information such as a secret mark, unsettled data without a seal impression in a manager field, etc., as the data un acquirable from other MFPs.

In this case, whether the data acquisition is prohibited may be managed by the MFP transmitting the data, or whether the data can be acquired may be determined by the MFP unacquiring the data.

FIGS. 5A and 5B depict an example of technical/business term list retained by each MFP; FIG. 5A shows an example of the business term list; and FIG. 5B shows an example of the technical term list.

The permanent memory (data storage portion 51 of FIG. 2) of each MFP stores the technical term list and the business term list for determining a data acquisition condition from other MFPs. These lists are managed in the technical/business term list managing portion 41e of FIG. 3.

Each MFP determines a word acting as a key for acquiring data stored in other MFPs based on terms in these lists. These lists are preset in each MFP. A user can perform edit such as addition and deletion of the terms in the list.

FIG. 6 depicts an example of a table (referred to as a log information table) showing a result of classification by jobs and analysis of the log information of data processed by the own machine.

The items set in the log information table are a data name (ID name) indicating a name of each job, a data creation date, a word list after performing morphological analysis, a word existing in the technical/business term list and the number of usage times thereof, the presence of a seal impression in a manager field, and the presence of confidential information such as a secret mark; analysis corresponding to these items is performed for each job; and the result is retained in the MFP.

In the example of the log information table of FIG. 6, for example, data names such as "Domestic Sales in December" and "Foreign Sales in November" and ID names such as "3541256.pdf" are recorded for the data name for each job, and the data creation dates are recorded. The data creation date is data of a date when the printing process or image reading process is performed. The log information at the time of performing these processes is listed in the log information table.

The morphological analysis is performed for the data corresponding to each job; words included in the data are classified; and the number of word usage times in the job is counted and recorded in the "word list after the morphological analysis".

For example, with regard to the job of the "Domestic Sales in December" of FIG. 6, the data creation date is Dec. 27, 2005; as a result of the morphological analysis, a word "sales" is used three times in the data; a word "multi-function peripheral" is used once; and a word "December" is used once.

The words listed in the "word list after the morphological analysis" are compared with the technical/business term list shown in FIGS. 5A and 5B to extract words listed in the technical/business term list from the words listed in the "word list after the morphological analysis", and the number of word usage times in the data of the job is counted and recorded in the "word existing in the technical/business term list and the number of usage times".

For example, in the example of the "Domestic Sales in December" of FIG. 6, since the "sales" and the "multi-function peripheral" are included in the technical/business term list, these words are extracted, and the number of usage times of each word is recorded.

In the log information table of FIG. 6, when a manager field is set for a seal impression to the print data or the read image data, the presence of the seal impression in the manager field is detected and the detection result is recorded.

To detect the presence of the seal impression, predetermined format information is retained in advance in the MFP. The format information is compared with the data (print data and read image data) to determine the manager field, and if some sort of image (due to the seal impression) exists in the manager field, it can be determined that the seal impression exists. An image analysis may be used to determine whether the image due to the seal impression exists and to determine whether the seal impression is that of a predetermined manager.

In the log information table of FIG. 6, it is determined whether confidential information such as a secret mark or "CONFIDENTIAL" is added to target data, and the determination result is recorded.

The portion corresponding to the "word existing in the technical/business term list and the number of usage times", the "presence of a seal impression in a manager field" and the "presence of confidential information" is defined as a "word usage list".

New information is added to the log information table including the word usage list every time the MFP performs a job of the printing process or image reading process.

In the embodiment, the acquisition condition of data acquired by the MFP from other MFPs is automatically determined from a word usage frequency in the log information table created in the own machine and the number of jobs including a certain word. The word usage frequency and the number of jobs are counted for each period set by a user.

FIG. 7 depicts an example of a setting screen for setting a period of the data acquisition condition. In a certain MFP, when setting a condition of acquiring job data (data acquisition condition) from other MFPs, a period can be set on a screen such as FIG. 7.

A user can select either "yes" or "no" for the displayed period setting to select whether a period is set, and if "yes" is selected, the user can input and set a "set period". The user can also select "no" for the period setting.

In this situation, the set period can be set in a format such as "every αα days" or "every ββ months".

FIG. 8 depicts an example of a setting screen of a condition for determining the necessity of the data acquisition. After setting the set period in FIG. 7, on a screen of FIG. 8, it can be set whether the necessity of the data acquisition is determined by the word usage frequency or by the number of using jobs.

FIG. 9 depicts an example of a setting screen for the word usage frequency. If the word usage frequency is selected on the screen of FIG. 8, the screen of FIG. 9 is displayed. The user can set such that if a word listed in the word usage list of the log information table is used for a predetermined time or more in the set period set in FIG. 7, the data using the word are acquired from other MFPs. That is, a minimum value can be set for the number of times that the word is used in the set period. A word listed in the word usage list is a word existing in the technical/business term list among the words after the morphological analysis.

FIG. 10 depicts an example of a setting screen for the number of jobs. If the number of using jobs is selected on the screen of FIG. 8, the screen of FIG. 10 is displayed. The user can set such that if a job including a word listed in the word usage list of the log information table is processed for a predetermined time or more in the set period set in FIG. 7, the data using the word are acquired from other MFPs. That is, a minimum value can be set for the number of jobs in the set period. A word for counting the number of jobs is a word existing in the technical/business term list among the words after the morphological analysis.

FIG. 11 depicts an example of a list (an acquisition information list) determining whether data are acquired from other MFPs for each word in accordance with the condition determined on the screens such as FIGS. 7 to 10.

Based on the information of the log information table of FIG. 6, the necessity of the data acquisition is determined for each word in accordance with the condition set in FIGS. 7 to 10 to create the acquisition information list.

For example, the words in the word usage list of the log information table include "sales".

In all the jobs of the log information table, the number of usage times of the word "sales" is 10 times, and the number of jobs using the word "sales" is three.

The process of calculating the number of usage times and the number of jobs is performed for each word in the word usage list to create a list (acquisition information list) such as FIG. 11.

In accordance with the condition set on the screens of FIGS. 7 to 10, it is determined for each word that associated data are acquired from other MFPs. The acquisition of associated data of a word indicates a process of identifying jobs including the word from the log information tables retained by other MFPs to acquire data corresponding to the jobs from other MFP to the own machine. In this case, as described above, the log information (log information table) may be transmitted from other MFPs at a predetermined timing, or the own machine may refer to the log information tables of other MFPs.

When acquiring the associated data of a word, the acquisition information list itself created by the own machine may directly be transmitted to other MFPs. Other MFPs check the transmitted acquisition information list against the log information table stored in the own machine, and if data conform to the condition of the acquisition information list, the data are transferred to the transmitting MFP.

Since the word usage frequency and the number of jobs are set as the condition in the setting screens of FIGS. 7 to 10, the number of usage times or the number of using jobs is compared with the word usage frequency or the number of jobs set as the condition for each word in the acquisition information list of FIG. 11, and the necessity of the data acquisition is determined for each word to write "decided" or "undecided" for the data acquisition.

In the example of FIG. 11, the words "sales", "sales department", and "domestic" are words acting as keys for acquiring data from other MFPs. The acquisition information list of FIG. 11 is stored and retained in the permanent memory (data storage portion 51) of the MFP 10.

A grouping process of a plurality of MFPs connected on the network will be described.

FIG. 12 depicts an example of a list when the MFPs on the network are grouped depending on setup locations.

Many MFPs can be connected on the network and, for example, if a certain MFP acquires data from all the MFPs on the network, the traffic on the network becomes considerable and an amount of the acquired data also becomes considerable. In this case, the information truly needed for the MFP is at risk of being buried. To address such a problem, the MFPs on the network can be grouped and set such that the mutual data acquisition is performed only within the group.

FIG. 13 depicts an example of a screen for checking and setting the grouping of the MFPs.

The grouped MFPs can be checked on the screen of FIG. 13. The user can utilize this screen to perform the setting of addition and deletion of the grouped MFPs as needed. The authority to set the grouping may be granted only to a user having a certain ID. The list of FIG. 12 is stored and retained in the permanent memory (data storage portion 51) of the MFP 10.

An example of condition setting for continuously performing the data acquisition from other MFPs will be described. FIG. 14 depicts an example of a setting screen for setting a continuation condition of the data acquisition. The screen of FIG. 14 can be used to set an item defined as a basis for continuing the data acquisition. The user can select either "number of utilization times" or "importance", and whether the data acquisition is continued is determined in accordance with the selected item.

FIG. 15 depicts an example of a number of utilization times setting screen. When the number of utilization times is selected on the screen of FIG. 14, the number of utilization times and a period can be set in FIG. 15. By setting the number of utilization times and the period, for example, if a word is used for γγ times in δδ days, the data acquisition from other MFPs is continued for the word corresponding to the condition.

FIG. 16 depicts an example of an importance setting screen. When the importance is selected on the screen of FIG. 14, the importance can be set in FIG. 16.

The importance can be set for each word and, in this example, any one of "high", "intermediate" and "low" can be set as the importance of each word. In accordance with the importance, it can be determined for each word whether the data acquisition from other MFPs is continued.

FIG. 17 depicts an example of a screen that sets a condition of terminating the data acquisition. The screen of FIG. 17 can be used to set the elapsed period from the last usage date of each word, and if this elapsed period of a word has elapsed, the data acquisition is discontinued for that word.

The elapsed period can be set for each importance of the words. For example, in the case of a word with the high importance, the data acquisition can always be continued regardless of the utilization by the user and, in the case of a word with the medium or low importance, it is determined whether the word is utilized in the specified elapsed period and the data acquisition can be continued only when the word is utilized.

FIG. 18 depicts an example of a table (a continuation determination table) determining whether the data acquisition from other MFPs is continued for each word in accordance with the condition determined on the screens such as FIGS. 14 to 17.

Based on the information of the word usage list included in the log information table of FIG. 6, the necessity of the continuation of the data acquisition is determined for each word in accordance with the condition set in FIGS. 14 to 17.

The "number of utilization times", "importance" and "last usage date" are set as items for each word in the continuation determination table of FIG. 18; these information is used for determination whether the data acquisition is continued for the word; and the determination result is written in the continuation determination table. The last usage date is date data of the last day when the data including the word is reused by the user.

If the number of utilization times is selected in FIG. 14, the data of the importance are not set or the field itself is not created for the importance. On the other hand, if the importance is selected in FIG. 14, the data of the number of utilization times are not set or the field itself is not created for the number of utilization times.

If the number of utilization times and the period are set in FIG. 15, the number of utilization times of each word is counted and recorded for each set period. If the number of utilization times is counted for each set period, for example, the count value of the number of utilization times may be reset every time the set period elapses, or the number of utilization times of the latest set period may be always counted.

When the number of utilization times of each word is counted for the set period, if the data including the word is utilized for the setting number of utilization times or more in the set period, the data acquisition related to that word is continued.

When the importance is set in FIGS. 14 and 16 and the period is set for each importance in FIG. 17, the importance is extracted for each word in the continuation determination table of FIG. 18, and if the data including the word is utilized before the elapsed period set correspondingly to the importance elapses from the last usage date, the data acquisition related to that word is continued.

In the example of FIG. 18, the words "sales" and "domestic" are words for continuing the data acquisition from other MFPs. The continuation determination table of FIG. 18 is stored and retained in the permanent memory (data storage portion 51) of the MFP 10.

FIG. 19 depicts an example of a screen that sets a condition of deleting data acquired from other MFPs. On the screen of FIG. 19, the user can set the period for deleting the data stored in the MFP. The elapsed period from the last usage date of data can be set as an "interval" and if the data are not used before the elapsed period elapses from the last usage date, the data are deleted.

FIG. 20 depicts an example of creating a table of data acquired by the MFP from other MFPs. The table of FIG. 20 is referred to as an "acquisition data table".

The items set in the acquisition data table of FIG. 20 are a data name (ID name) indicating a name of each job, the data creation date, the last usage date of data, a scheduled data deletion date, a word after performing morphological analysis, and a word existing in the technical/business term list. The acquisition data table of FIG. 20 is stored and retained in the permanent memory (data storage portion 51) of the MFP 10.

For example, if the data are set to be deleted after one year has elapsed from the last usage date, a screen for confirming the deletion of the data is displayed after one year from the last usage date. If the user inputs confirmation of the deletion, the data are deleted.

In the above data acquisition system, if the MFP acquiring data compares the log information tables (FIG. 6) retained in other MFPs transmitting data with the own acquisition data table (FIG. 20) and does not acquire the data retained in the own acquisition data table from other MFPs, the double acquisition of data can be prevented.

Figure 21:
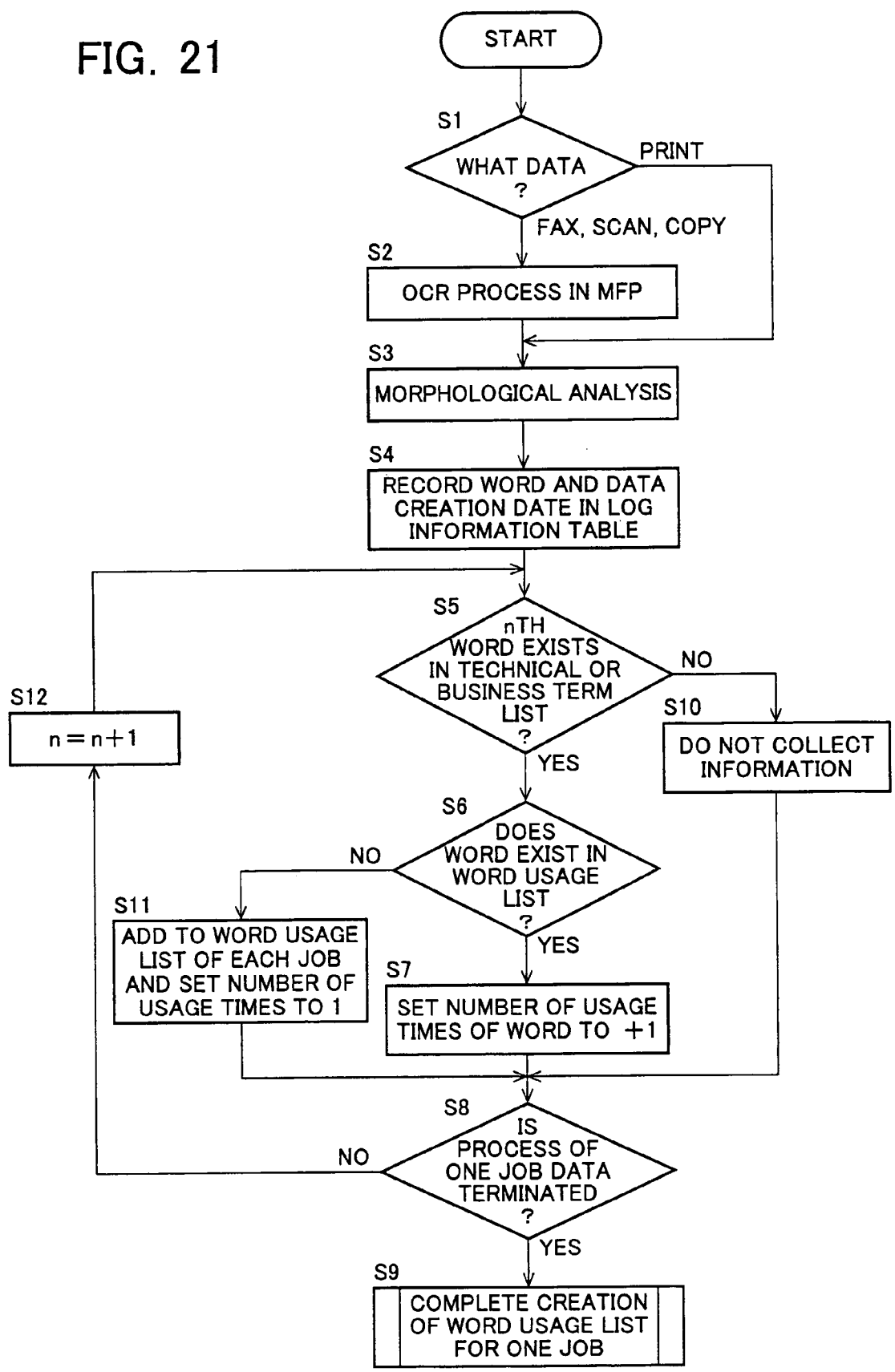
FIG. 21 is an explanatory flowchart of an example of the creating process for the log information table shown in FIG. 6.

FIG. 21 is an explanatory flowchart of an example of the creating process for the log information table shown in FIG. 6.

If data are processed by the MFP 10, it is determined what kind of data is processed (step S1). If the processed data is the scan, FAX, or copy data, the image processing portion 2 of the MFP 10 performs the OCR process (step S2). The data obtained by the OCR are subjected to the morphological analysis by the morphological analysis portion 42 and classified into words (step S3).

If the processed data are the print data at step S1, the data are subjected directly to the morphological analysis since the data are already characters (step S3).

The words classified in the morphological analysis and the data creation dates are recorded in the log information table (FIG. 6) (step S4).

It is then verified whether an nth word (n=1, 2, 3 . . . ) of the words classified in the morphological analysis is included in the technical/business term list (FIGS. 5A and 5B) (step S5). If the nth word is not included in the technical/business term list, the information is not collected for this word (step S10) and the process goes to step S8.

If the nth word is included in the technical/business term list, it is determined whether the word already exists in the word usage list (the field of the "word existing in the technical/business term list and the number of usage times" of FIG. 6) included in the log information table (step S6).

If the nth word exists in the word usage list, +1 is added to the number of usage times of the word (step S7). If the nth word does not exist in the word usage list, the word is added to the word usage list of each job and the number of usage times is set to one (step S11).

When the process for data of one job is terminated (step S8, YES), the creation of the word usage list for one job is completed (step S9). If the process for data of one job is not terminated (step S8—NO), one is added to n (step S12), and the process goes back to step S5 to create the word usage list for the next word.

Figure 22:
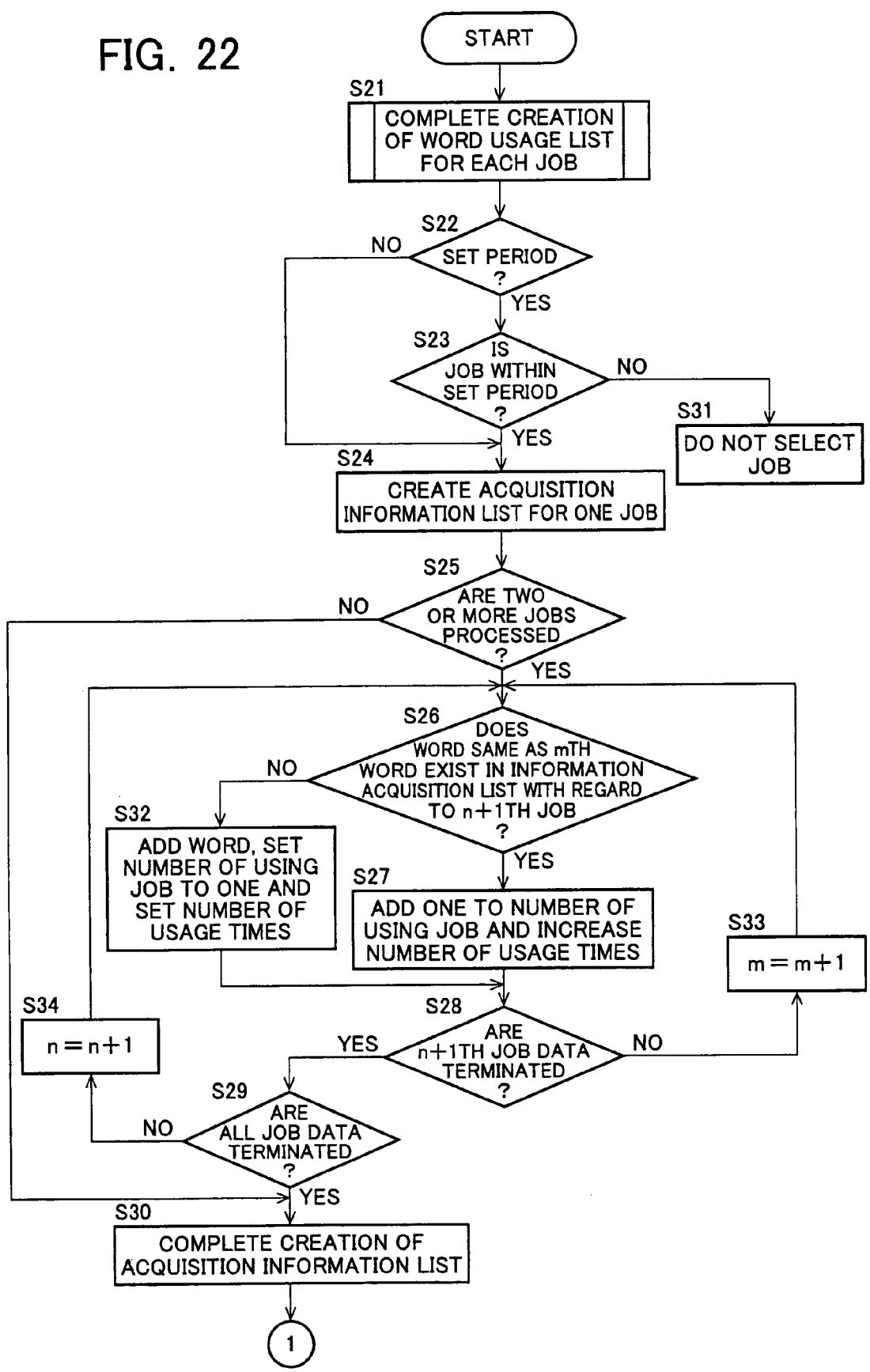
FIG. 22 is an explanatory flowchart of an example of the creating process for the acquisition information list shown in FIG. 11.

FIG. 22 is an explanatory flowchart of an example of the creating process for the acquisition information list shown in FIG. 11.

It is assumed that the creation of the word usage list of each job is completed with the flow shown in FIG. 21 (step S21). It is determined whether the period is set in the data acquisition condition (step S22). If the period is set, it is determined whether the job is a job within the set period (step S23).

If the job is not a job within the set period, the job is not selected (step S31). If the job is a job within the set period, the acquisition information list (FIG. 11) is created for one job (step S24). In this case, the words listed in the word usage list of the log information table of FIG. 6 are set in the acquisition information list, and the number of usage times of each word is counted and recorded in the field of the number of usage times. In this situation, the number of using jobs is one.

It is then determined whether two or more jobs are processed in the set period (step S25). If two or more jobs are not processed in the set period, the creation of the acquisition information list is completed (step S30).

If two or more jobs are processed in the set period, it is determined next with regard to an n+1th job (n=1, 2, 3 . . . ) whether the acquisition information list includes the word same as an mth word of the job (m=1, 2, 3 . . . ) (step S26). The target words of the job in this situation are the word listed in the word usage list of the log information table of FIG. 6.

If the acquisition information list includes the word same as the mth word, +1 is added to the number of using jobs related to the word, and the number of usage times is increased by the number of times the word is used by the job (step S27).

If the acquisition information list does not include the word same as the mth word, the word is added to the acquisition information list; the number of using jobs is set to one; and the number of usage times is increased by the number of times the word is used by the job (step S32).

After the step S27 or S32, it is determined whether the process for the n+1th job data is terminated (step S28), and if the process of the job data is not terminated, one is added to m (step S33), and the process goes back to step S26 to determine whether the next word exists in the acquisition information list. If the process for the n+1th job data is terminated, it is determined whether the process for all the job data is terminated (step S29).

If all the processes for all the job data are not terminated, one is added to n (step S34), and the process goes back to step S26 to add words of the next job to the acquisition information list.

If all the processes for all the job data are terminated at step S29, the creation of the acquisition information list is completed.

Figure 23:
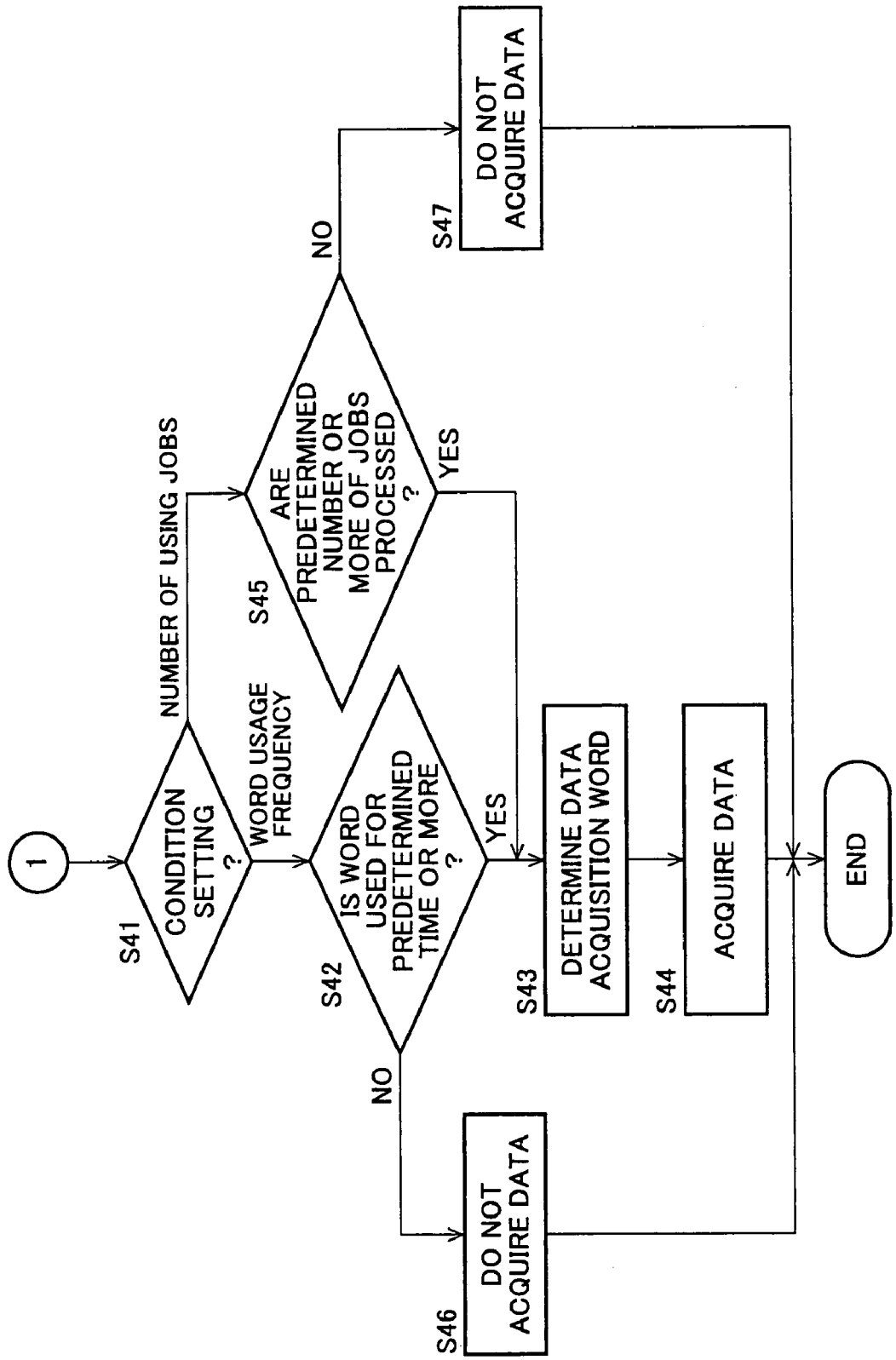
FIG. 23 is an explanatory, flowchart of an example of the process continued from FIG. 22.

FIG. 23 is an explanatory flowchart of an example of the process continued from FIG. 22.

When the creation of the acquisition information list is completed at step S30, the item of the condition setting is determined which is used for determining the necessity of the data acquisition (step S41). It is determined which of the word usage frequency and the number of using jobs is set for determining the necessity of the data acquisition on the screen shown in FIG. 8.

If the usage frequency is set, it is determined whether a certain word is used for a predetermined time or more in the set period (step S42). If a word is not used for a predetermined time or more, the data associated with the word are not acquired from other MFPs (step S46).

If a word is used for a predetermined time or more, the word is determined as a word for acquiring data (step S43) and the data associated with the determined word are acquired from other MFPs (step S44).

If the number of using jobs is set at step S41, it is determined whether a predetermined number or more of jobs are processed in the set period (step S45). If a predetermined number or more of jobs are not processed, data acquisition is not performed from other MFPs (step S47). If a predetermined number or more of jobs are processed, the word is determined as a word for acquiring data (step S43) and the data associated with the determined word are acquired from other MFPs (step S44).

Figure 24:
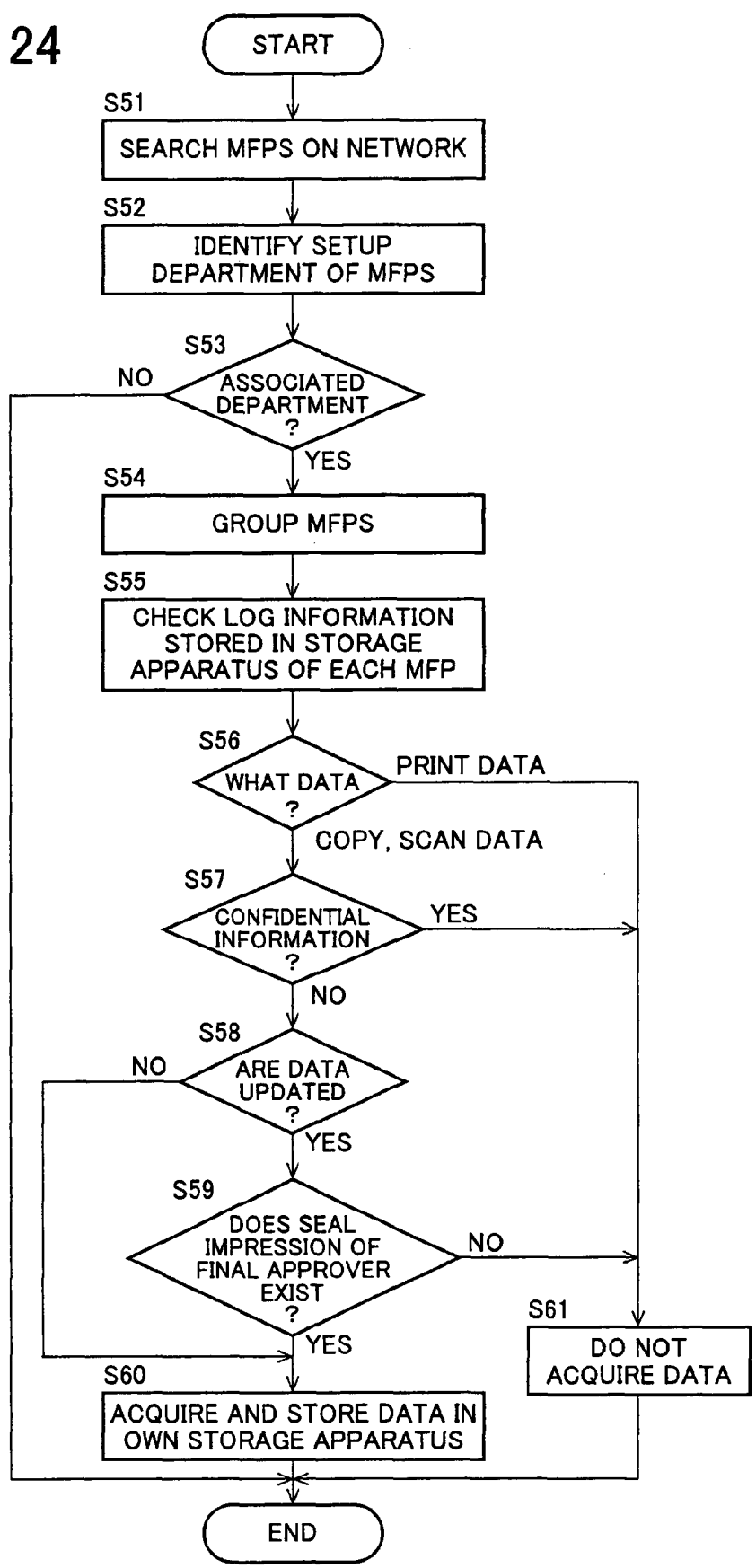
FIG. 24 is an explanatory flowchart of an example of the MFP grouping process and the process of information acquisition from other MFPs.

FIG. 24 is an explanatory flowchart of an example of the MFP grouping process and the process of information acquisition from other MFPs.

In a system connecting a plurality of MFPs through a network, if a new MFP is connected to the network, the MFP searches other MFPs on the network (step S51). The setup departments of the searched MFPs are identified (step S52). The setup departments can be determined based on network setting values, etc., such as IP addresses, of the MFPs. If MFPs exist in the related department (step 53—YES), the MFPs are grouped (step S54). If no MFP exists in the related department (step S53—NO), the process is terminated.

The log information which is stored in the storage apparatuses of other grouped MFPs is then checked (step S55). It is determined what kind of data corresponds to the log information (step S56).

If the data stored in other MFPs are the print data, the acquisition (data acquisition) is not performed (step S61). Since the print data are the character commands and the document can easily be edited and tampered, the print data are not acquired from other MFPs in this example. In this case, the MFP retaining the data may perform management such that the print data are not transmitted, or the MFP acquiring the data may perform control such that the information is not acquired in the case of the print data.

On the other hand, if the data stored in other MFPs are the copy data or scan data, it is further determined whether the data are handled as confidential information (step S57). In the case of the confidential information, the information is not acquired (step S61). In this case, the MFP retaining the data may perform management such that the confidential information is not transmitted, or the MFP acquiring the data may perform control such that the information is not acquired in the case of the confidential information.

If the data are not confidential information, it is further determined whether the data are updated (step S58). With regard to the determination of the update, for example, if a plurality of pieces of data has the same file name, it can be determined that these data are updated. If the data are not updated, the information (data) is acquired and stored in the own storage apparatus (step S60).

If the data are updated, it is further determined whether a seal impression of a final approver exists (step S59). With regard to the determination of the presence of the seal impression, as described above, a field of the final approver such as a manager is determined from predetermined format information, and if an image (due to the seal impression) exists in the field of the final approver, it can be determined that the seal impression exists. Alternatively, the image analysis may be used to determine whether the image due to the seal impression exists and to determine whether the seal impression is that of a predetermined final approver.

If the seal impression of the final approver does not exist, the data acquisition is not performed (step S61). This is because it is considered that the data are not finally approved. If the seal impression of the final approver exists, the data are acquired and stored in the own storage apparatus since the data are considered as the final update data (step S60).

The MFP can select and set whether the acquisition is performed for all the data retained by other MFPs in the same group or for only the data associated with a certain word in accordance with the above acquisition information list.

Figure 25:
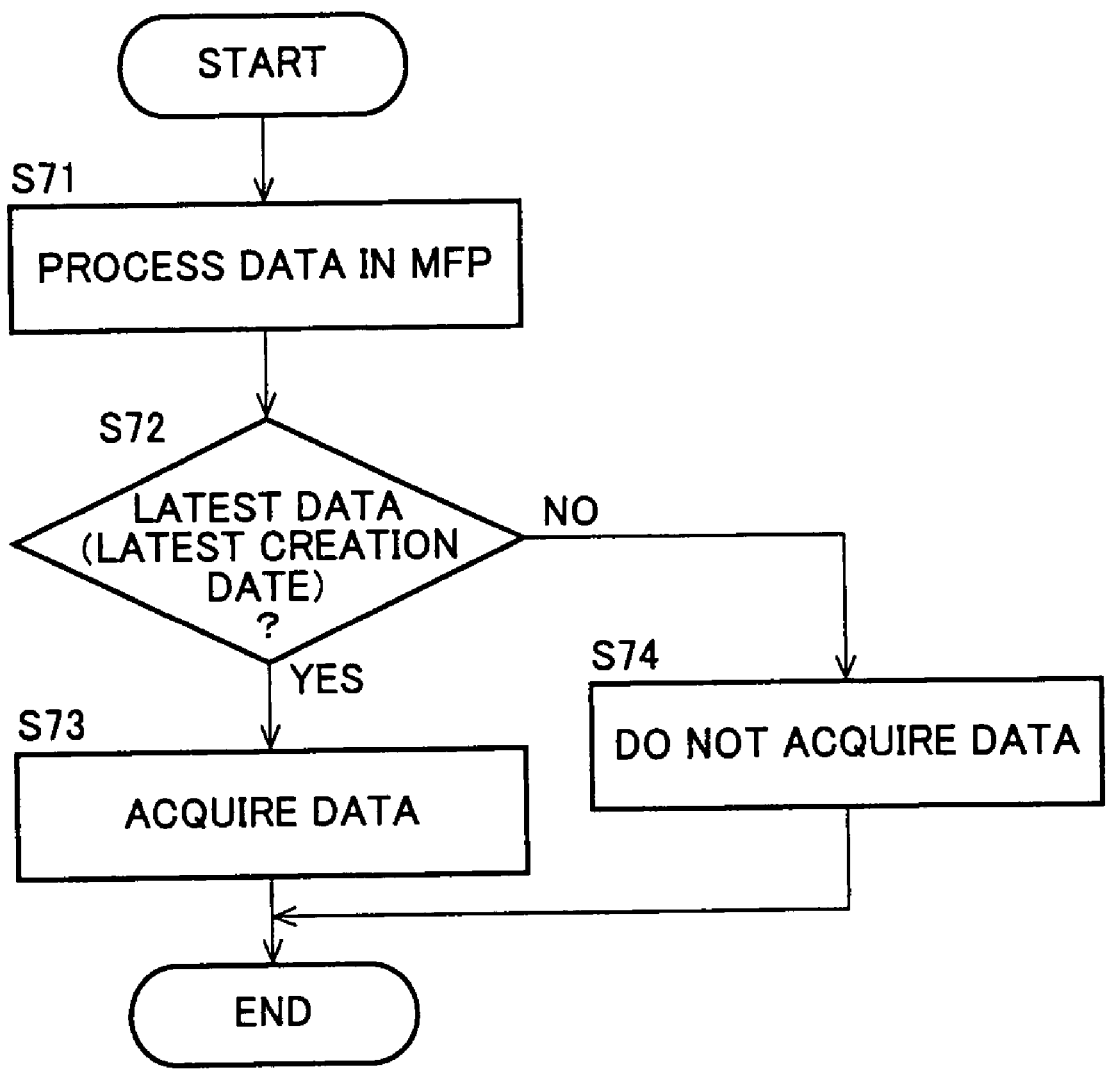
FIG. 25 is an explanatory flowchart of an example of the process of determining whether target data are the last updated data when acquiring data from other MFPs.

FIG. 25 is an explanatory flowchart of an example of the process of determining whether target data are the last updated data when acquiring data from other MFPs.

When the MFP performs the data process such as the printing process or the image reading process (step S71), an MFP acquiring data of that MFP determines whether the data are the latest data (data with the latest creation date) (step S72). For example, if the data have the same file name, the latest data can be determined from a date indicated in a document in the case of the scan and copy data and can be determined from a file creation date in the case of the print data. If the data do not have the same file name, it is determined that the data are not the updated data.

If data are the latest data, the data are acquired (step S73). If data are not the latest data, the data acquisition is not performed (step S74).

Figure 26:
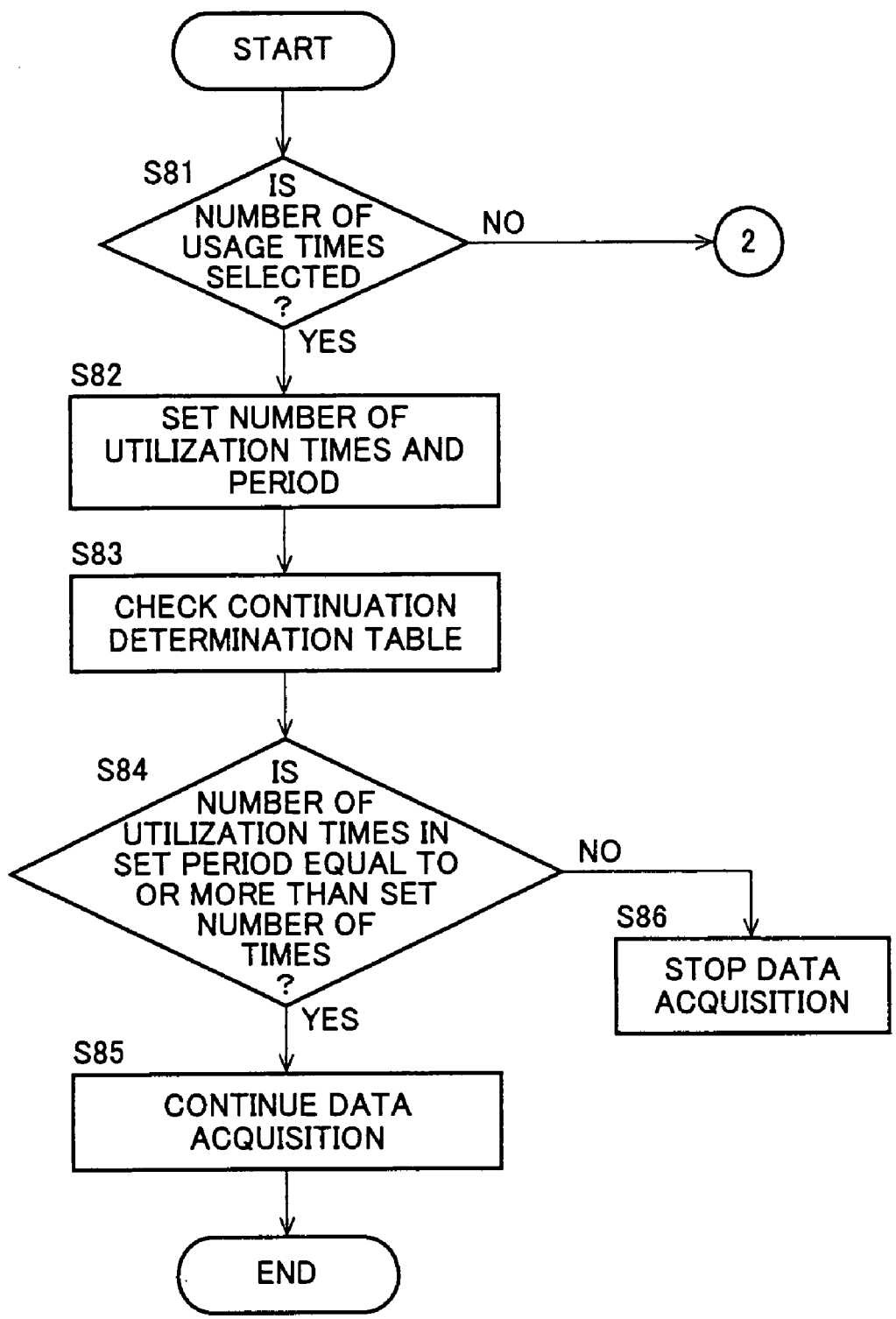
FIG. 26 is an explanatory flowchart of an example of the process when the data acquisition from other MFPs is continued.
Figure 27:
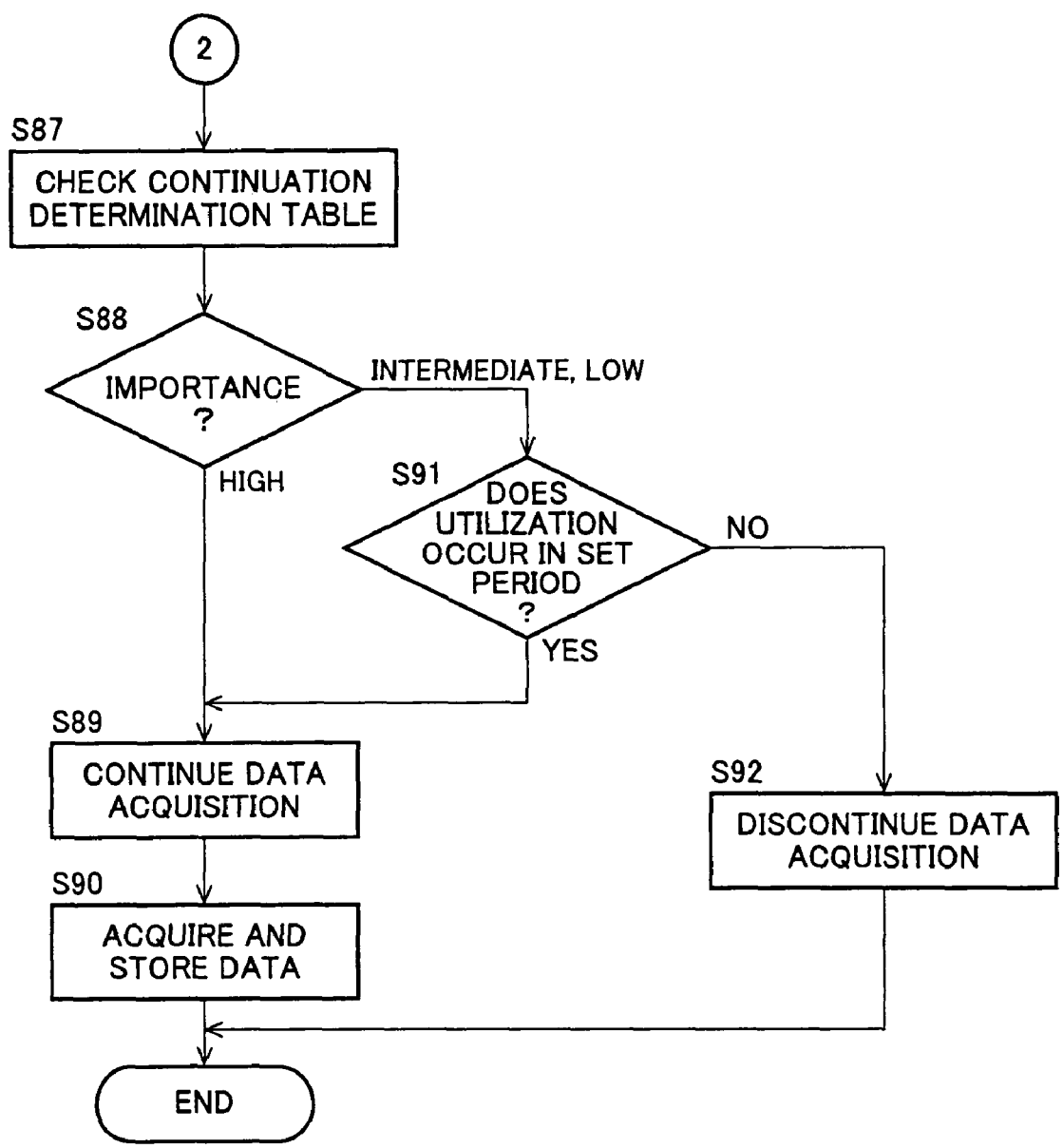
FIG. 27 is an explanatory flowchart of an example of the process when the data acquisition from other MFPs is continued.

FIGS. 26 and 27 are explanatory flowcharts of an example of the process when the data acquisition from other MFPs is continued.

In FIG. 26, if the number of utilization times is not selected as a basis for continuing the data acquisition (step S81—NO), i.e., if the importance is selected, the process goes to the flow of FIG. 27.

If the number of utilization times is selected (step S81—YES), the number of utilization times and the period are set (step S82). The basis can be selected from the number of utilization times or the importance on the above screen of FIG. 14, and the number of utilization times and the period can be set on the screen of FIG. 15.

The continuation determination table (FIG. 18) which records the number of utilization times in the set period, the last usage date, etc., is checked for each word included in the data acquired from other MFPs (step S83).

As a result, if the data including the word are utilized for the set number of times or more in the set period (step S84—YES), the acquisition of the data associated with the word is continued (step S85). If the data including the word are not utilized for the set number of times or more in the set period, the data acquisition associated with the word is stopped (step S86).

FIG. 27 is an explanatory flowchart of an example of the process when the importance is selected in FIG. 26.

If the importance is selected as the basis of continuing the data acquisition, the continuation determination table stored in the own MFP is checked (step S87). In this case, the continuation determination table which records the importance and the last usage date for each word included in the data acquired from other MFPs is also used as shown in FIG. 18.

The importance of each word is determined (step S88), and if the importance is high, the data acquisition associated with the word is continued (step S89), and the data are acquired and stored from other MFPs (step S90).

If the importance of each word is intermediate or low, it is determined whether the data including the word are utilized in the set period (step S91), and if the data are not utilized in the set period, the data acquisition associated with the word is stopped (step S92).

For example, all the words are set to the high importance by default, and if the importance is high, the data acquisition including the word is continued regardless of the last usage date. By setting the set period to one month in the case of the intermediate importance and two weeks in the case of the low importance, the data acquisition can be discontinued when the period has elapsed from the last usage date.

Figure 28:
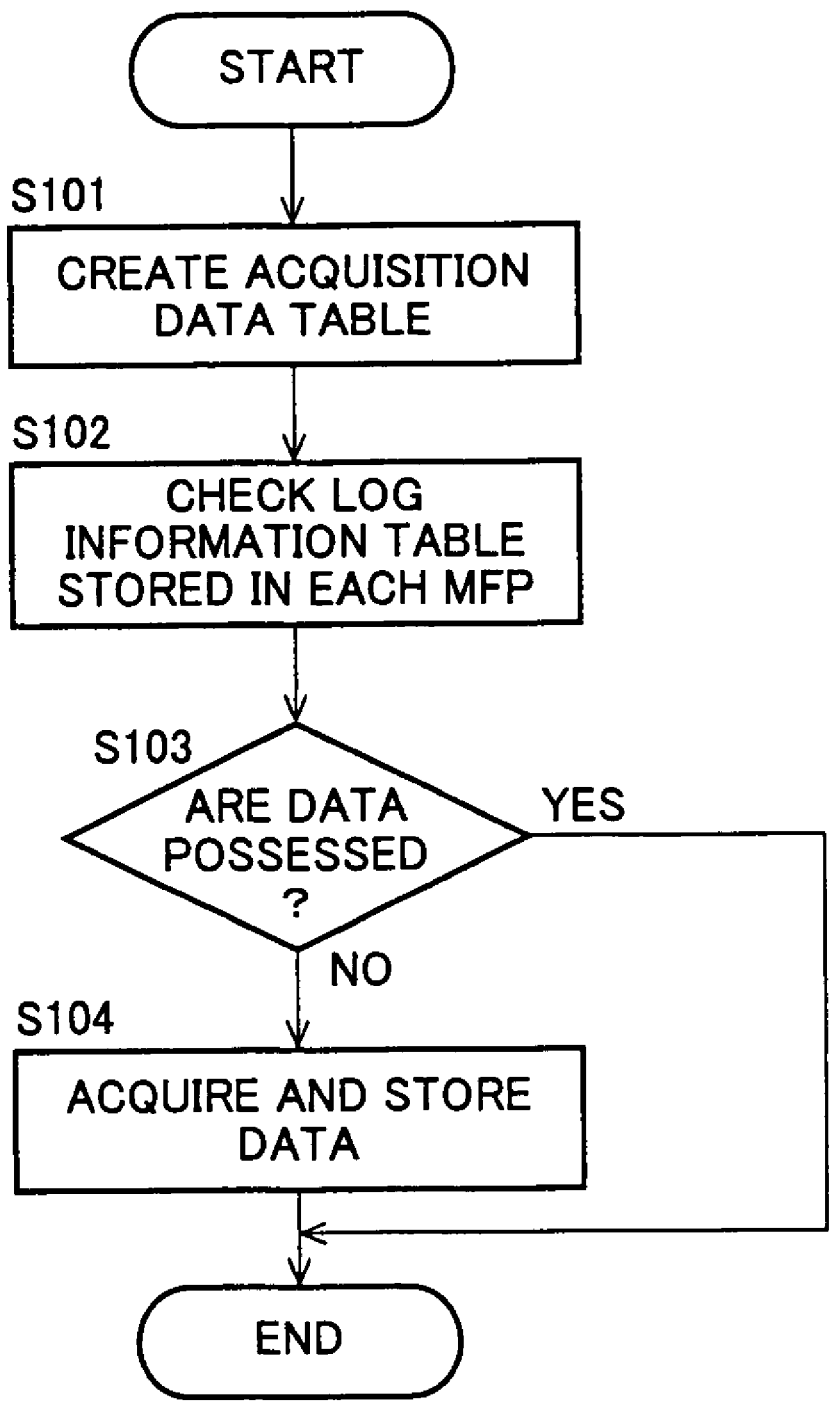
FIG. 28 is an explanatory flowchart of an example of the process of preventing double acquisition of information from other MFPs.

FIG. 28 is an explanatory flowchart of an example of the process of preventing double acquisition of information from other MFPs.

The MFP creates the acquisition data table showing a list of data acquired from other MFPs (step S101). The acquisition data table can be created in the form shown in FIG. 20.

The log information tables stored in other MFPs are checked (step S102) to compare the data stored in other MFP with the own acquisition data list, and if the own machine already possesses the data stored in other MFPs (step S103—YES), the process is terminated without acquiring the data from other MFPs. If the own machine does not possess the data stored in other MFPs (step S103, NO), the data are acquired and stored in the own machine (step S104).

Figure 29:
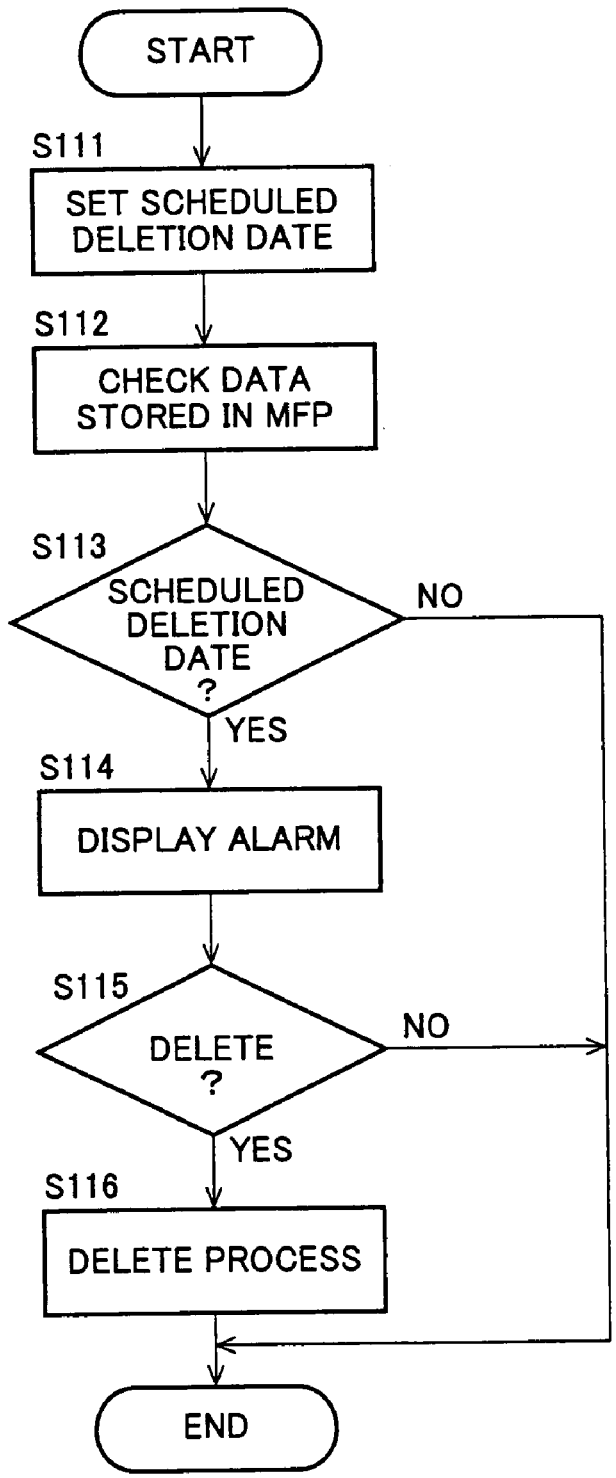
FIG. 29 is an explanatory flowchart of an example of the process of deleting data stored in the MFP.

FIG. 29 is an explanatory flowchart of an example of the process of deleting data stored in the MFP. A user sets a scheduled deletion date of the data stored in the MFP (step S111). The scheduled deletion date can be set on the screen shown in FIG. 19. A period from the last usage date of data until deleting the data can be set in this case.

The set scheduled deletion date is listed and stored in the acquisition data table shown in FIG. 20. The MFP checks data stored in the own machine (step S112). In this case, the MFP can be set such that the data of the own machine are checked every predetermined period such as once a day.

If some data stored in the own machine exceed the scheduled deletion date (step S113—YES), the alarm display is performed (step S114). If the user inputs approval for deleting the data in response to the alarm display (step S115—YES), a process is performed to actually delete the data (step S116).

If no data exceed the scheduled deletion date at step S113, or if the user does not approve deletion of the data at step S115, the process is terminated.

According to the present invention, the following effects can be acquired.

The present invention can provide a multi-function peripheral that can automatically determine an acquisition condition of information based on data processed by the multi-function peripheral to acquire information from other multi-function peripherals in accordance with the condition while maintaining security in a system that enables sharing of information by connecting a plurality of multi-function peripherals with the information thereof through a network, and provide an information acquisition system including a plurality of the network-connected multi-function peripherals.

Especially, according to the present invention, since data processed by other multi-function peripherals are acquired based on log information of a job processed by the multi-function peripheral, information desired by a user using the multi-function peripheral and information associated with frequently utilized information can automatically be received from other multi-function peripherals without using a personal computer, a server, etc.

Every time the multi-function peripheral processes data, at a predetermined timing set in advance, or in accordance with a log information reference request input from other multi-function peripherals, the log information stored in the multi-function peripheral can be transmitted to other multi-function peripherals allowed to acquire data. Alternatively, the information acquisition list itself listing the data acquisition conditions can directly be transmitted to other multi-function peripherals. Therefore, the information transmission can flexibly be set for data acquisition.

According to the present invention, by preliminarily retaining a word list that lists words acting as keys for data acquisition from other multi-function peripherals, by referring to the word list to extract a word when the multi-function peripheral processes data, and by writing the word into the log information, data can be acquired from other multi-function peripherals based on a certain word included in the data and, wasteful information is not collected since data not likely to be used by a user are not acquired.

According to the present invention, when the multi-function peripheral processes data, the data are classified into words by the morphological analysis and checked against the word list, and the words acting as keys for data acquisition can automatically and accurately be extracted.

According to the present invention, since the word acting as the key for data acquisition is determined with the number of usage times of the word extracted from the data, the information including a word frequently used by a user can be acquired without omission.

According to the present invention, since the word acting as the key for data acquisition is determined by the number of jobs using the word extracted from the data, if the same word is used in a plurality of jobs, it can be determined that contents of a performed business operation is associated with the word and the information associated with the word can efficiently be acquired.

By enabling the selective setting of whether the word acting as the key for data acquisition is determined by the number of usage times of the above word or determined by the number of jobs using the word, a degree of freedom can be increased for the information acquisition condition to enhance the convenience for the user.

According to the present invention, by setting a period of counting the number of usage times of the word or the number of jobs using the word, the information can be acquired about the latest frequently used word and the accuracy of information collection can further be increased.

According to the present invention, by using unique identification information of other multi-function peripherals, such as department names of a company where the multi-function peripherals are disposed, to recognize the related department and by grouping a plurality of multi-function peripherals, an information acquisition range can automatically be set and since unnecessary information from departments with less correlation are not acquired, the storage apparatus of the multi-function peripheral can efficiently be used.

According to the present invention, by acquiring only the data that cannot be edited such as the scan data or copy data, the original data are not tampered and the security of the data can be maintained.

According to the present invention, by not acquiring data including information related to confidential items such as a secret mark from other multi-function peripherals, the security of the data can be maintained.

According to the present invention, if one multi-function peripheral processes data with the same file name for a plurality number of times, the data with the latest date are acquired or the final data are acquired using a seal impression of the final approver and, therefore, unnecessary old data are not acquired and the storage apparatus of the multi-function peripheral can efficiently be used.

According to the present invention, when data are acquired from other multi-function peripherals, since the continuation of the information acquisition is determined based on the number of reuse times of the data or the importance of the word included in the data, the storage apparatus of the multi-function peripheral can efficiently be used and the traffic can be reduced when transmitting the data.

By enabling the selective setting of whether the continuation of the information acquisition is determined based on the number of reuse times of the above data or determined based on the importance of the word included in the data, a degree of freedom can be increased for the condition of continuing the information acquisition to enhance the convenience for the user.

According to the present invention, by performing the morphological analysis of the data acquired from other multi-function peripherals to manage the data in a table and by referring to the table when acquiring new data, double acquisition of data can be prevented to reduce traffic when acquiring the data from other multi-function peripherals and to efficiently use the storage apparatus of the multi-function peripheral.

According to the present invention, since the last usage date of data acquired from other multi-function peripherals is used to set the scheduled deletion date of the data, unutilized data can be deleted after a predetermined period has elapsed and the storage apparatus of the multi-function peripheral can efficiently be used.

According to the present invention, by connecting a plurality of the above multi-function peripherals through a network, an information acquisition system which can achieve the above effects in each multi-function peripheral can be provided.

The invention claimed is:

1. A multi-function peripheral with a plurality of functions including a print function, a facsimile function, and a scanner function, comprising:

a storage portion that stores log information of a job performing a data process and data corresponding to the log information when data are processed with any one of the plurality of functions;

a retaining portion that creates and retains an acquisition information list defining a condition of acquiring information from other multi-function peripherals based on the data processed with any one of the plurality of functions, the acquisition information list including at least one of a keyword, presence of a seal impression, and presence of confidential information; and an acquiring portion that checks log information stored in other multi-function peripherals connected to the multi-function peripheral based on the acquisition information list to acquire data corresponding to the log information conforming to the condition defined in the acquisition information list from the other multi-function peripherals, and the acquired data includes at least one of the keyword, presence of the seal impression, and presence of the confidential information, the acquired data being stored in the storage portion of the multi-function peripheral.

2. The multi-function peripheral as defined in claim 1, wherein every time data are processed with any one of the plurality of functions, at a predetermined timing set in advance, or in accordance with a log information reference request input from other multi-function peripherals, the multi-function peripheral transmits the log information to other multi-function peripherals allowed to acquire data.

3. The multi-function peripheral as defined in claim 1, wherein the multi-function peripheral receives the acquisition information list from other multi-function peripherals to transmit data conforming to the condition defined in the acquisition information list to the other multi-function peripherals.

4. The multi-function peripheral as defined in claim 1, wherein the multi-function peripheral preliminarily retains a word list that lists words acting as keys for data acquisition from other multi-function peripherals, refers to the word list when data are processed with any one of the plurality of functions, extracts a word matched with the word list from the processed data, and writes the extracted word and the number of usage times of the extracted word in each job into the log information of the job conesponding to the data process.

5. The multi-function peripheral as defined in claim 4, wherein when data are processed with any one of the plurality of functions, the multi-function peripheral performs a morphological analysis to classify the processed data into words and checks the classified word against the word list to extract a word matched with the word list.

6. The multi-function peripheral as defined in claim 4, wherein in the acquisition condition of the acquisition information list, if the number of usage times of the word extracted from the data is a predetermined number of times or more or if the number of jobs using the extracted word is a predetermined number of times or more, the data including the extracted word are acquired from the other multi-function peripherals.

7. The multi-function peripheral as defined in claim 6, wherein setting can selectively be performed for whether the information is acquired based on the number of usage times of the extracted word or acquired based on the number of jobs using the extracted word.

8. The multi-function peripheral as defined in claim 6, wherein the multi-function peripheral can set a period of counting the number of usage times of the extracted word or the number of jobs using the extracted word and wherein every time the set period elapses, the multi-function peripheral counts the number of usage times of the extracted word or the number of jobs using the extracted word in the elapsed period to determine whether the data including the extracted word are acquired from the other multi-function peripherals.

9. The multi-function peripheral as defined in claim 1, wherein the multi-function peripheral groups other multi-function peripherals and the own machine based on unique identification information registered in each of other connected multi-function peripherals to acquire the data only from the grouped multi-function peripherals.

10. The multi-function peripheral as defined in claim 1, wherein the multi-function peripheral acquires only the data that cannot be edited, including scan data and copy data, from the other multi-function peripherals.

11. The multi-function peripheral as defined in claim 1, wherein if data corresponding to the log information retained by the other multi-function peripherals include information related to confidential items, the data are not acquired from other multi-function peripherals.

12. The multi-function peripheral as defined in claim 1, wherein if a plurality of data with the same file name exist in the log information retained by the other multi-function peripherals, only the latest data are acquired from the other multi-function peripherals based on the creation date of the data with the same file name.

13. The multi-function peripheral as defined in claim 1, wherein if a plurality of data with the same file name exist in the log information retained by the other multi-function peripherals, it is determined in accordance with a predetermined image analyzing process result whether the data include a seal impression in a seal impression field of a final approver and wherein only the data including a seal impression in the seal impression field of the final approver are acquired from the other multi-function peripherals.

14. The multi-function peripheral as defined in claim 6, wherein after the data including the word written into the log information are acquired from the other multi-function peripherals, the multi-function peripheral determines whether the data acquisition from the other multi-function peripherals is continued for the word included in the data, based on the number of reuse times of the data in a predetermined period.

15. The multi-function peripheral as defined in claim 6, wherein the multi-function peripheral can set importance of the word written into the log information and wherein after the data are acquired from the other multi-function peripherals, the multi-function peripheral determines whether the data acquisition from the other multi-function peripherals is continued for the word, based on the importance of the word included in the acquired data.

16. The multi-function peripheral as defined in claim 14, wherein setting can selectively be performed for whether the data acquisition is continued based on the number of reuse times of the data in the predetermined period or continued based on the importance of the word.

17. The multi-function peripheral as defined in claim 15, wherein setting can selectively be performed for whether the data acquisition is continued based on the number of reuse times of the data in the predetermined period or continued based on the importance of the word.

18. The multi-function peripheral as defined in claim 1, wherein the multi-function peripheral includes a table of the data acquired from the other multi-function peripherals and wherein double acquisition of the same data from the other multi-function peripherals is prevented by comparing the log information stored in the other multi-function peripherals with the table of the data acquired from the other multi-function peripherals.

19. The multi-function peripheral as defined in claim 1, wherein after acquiring the data from the other multi-function peripherals, the multi-function peripheral sets a scheduled deletion date based on the last usage date of reuse of the acquired data to display an alert indicating that the corresponding data are deleted when the scheduled deletion date is passed.

20. An information acquisition system including a plurality of the multi-function peripherals as defined in any one of claims 1 to 19 through a network, the information acquisition system enabling a data acquisition process among the multi-function peripherals.

* * * * *